UNITED STATES PATENT OFFICE 2,598,659

PREPARATION OF DIAGNOSTIC ANTIGENS

Carl J. De Boer, Perth Amboy, N. J., assignor to American Cyanamid Company, New York, N. Y., a corporation of Maine No Drawing. Application April 20, 1949, Serial No. 88,690

3 Claims. (Cl. 167—78)

This invention relates to improvements in diagnostic antigens. More particularly, the invention relates to a process whereby specific complement-fixing antigens are prepared which are free from the tendency to give false positive reactions with sera of patients having had syphilis. The new product is also included within the scope of the invention.

During the past several years numerous complement-fixing antigens for viral and Rickettsial diseases have been developed and found generally acceptable as useful diagnostic agents. Complement-fixing diagnostic antigens for St. Louis and Japanese B. encephalitis, Eastern and Western equine encephalomyelitis, scrub typhus, murine typhus, Rocky Mountain spotted fever, psittacosis, lymphogranuloma venereum, rabies, Colorado tick fever and other like viral diseases have been prepared from suitably infected living tissue. Brain tissue, spleen, heart, chick, embryos, egg yolk sac, and the like are usually used as rich sources of the antigen. As useful as these preparations are, they have, nevertheless, been frequently found to be non-specific in that occasionally the test indicates the disease in patients who have not suffered from it.

It has been found that viral and Rickettsial antigens prepared from tissue such as that just mentioned usually contain an antigen which reacts strongly with syphilitic serum. This antigen occurs naturally in most tissue used in the manufacture of the viral and Rickettsial antigens. It appears to be associated with the lipoidal fractions of the tissue but its chemical and physical nature is otherwise obscure. It is soluble in alcohol but insoluble or slightly soluble in ether. Efforts to separate this antigen from the viral antigens have either been unsuccessful or have resulted in denaturation or simultaneous extraction of the antigen. Inasmuch as a successful diagnostic agent should be free of interfering elements it is desirable that methods of separating viral antigens from syphilitic antigens be made available.

I have discovered that the susbtance which is normally present in most commercial types of diagnostic viral antigens that are prepared from fat-bearing living tissue which gives rise to a false reaction in the complement-fixation test with sera of patients having previously suffered from syphilis can be separated from the diagnostic antigen, whether of viral or Rickettsial origin, without destruction of the latter or serious reduction of its titer by a simple extraction with dichlorethylene.

To illustrate the manner in which antigens prepared by conventional methods from fertile hens' eggs give false positive reactions with syphilitic sera a number of antigens were made and tested as shown in the following table. To prepare the antigen, eleven day old fertile incubated eggs were injected with 0.1 ml. of a 1:100 dilution of chick embryo suspensions infected with Eastern and Western equine encephalomyelitis virus into the choro-allantoic sac and the embryos removed after 18 to 20 hours. A 20% suspension in isotonic saline was prepared in a Waring blender and the material frozen and thawed five times, then centrifuged at 3000 R. P. M. for 20 minutes. The clear, supernatant liquid was removed and diluted with an equal volume of saline. Preparations of this type were infectious for mice in titers to $10^{-8}$ for Western equine encephalomyelitis and $10^{-8.5}$ to $10^{-9}$ for the Eastern strain respectively. For control purposes an antigen from eleven day normal chick embryos was prepared in the same manner.

These antigens were tested by the well-known complement-fixation test against immune sera from guinea pigs. These immune sera were prepared in the usual way by methods known to those in the art.

The method of Kolmer and Boerner for complement-fixation with overnight incubation in the chill room was used. Antigens were titrated for antigenic activity. The complement was titrated in the presence of two units of antigen. The dilutions shown in the table were made with isotonic saline. In the test 0.25 ml. of serum, 0.25 ml. of antigen and 0.5 ml. of complement containing two exact units were used. Following overnight incubation in the chill room the hemolytic system consisting of 0.25 ml. of amboceptor containing two units and 0.25 ml. of 3% suspension of sheeps' red cells were added. Controls of serum, antigen, red cells, and the hemolytic system were included in each test but are not shown in the table. The tubes were reincubated in a water bath at 37° C. for a half hour or until the controls became clear. The numeral 4 represents complete fixation whereas the smaller numbers indicate proportionately lower fixation.

The results are shown in the following table:

TABLE I

*Complement fixation tests with unextracted egg antigens*

| Serum | Eastern E. E. | Western E. E. | Syphilitic Human | | | |
|---|---|---|---|---|---|---|
| Antigen | Eastern E. E. | Western E. E. | Eastern E. E. | Western E. E. | Egg Normal | Kolmer |
| Serum Dilutions: | | | | | | |
| 1:4 | 4 | 4 | 4 | 4 | 4 | 4 |
| 1:8 | 4 | 4 | 4 | 4 | 4 | 4 |
| 1:16 | 4 | 4 | 3 | 4 | 4 | 4 |
| 1:32 | 4 | 4 | ± | 3 | 1 | 4 |
| 1:64 | 4 | 4 | — | ± | — | 2 |
| 1:128 | 3 | 1 | — | — | — | — |
| 1:256 | | | — | — | — | — |

Results not recorded in the table show that the antigens do not react with normal and heterologous immune guinea pig sera. That is, an antigen prepared from egg embryos infected with Eastern equine encephalomyelitis gave positive reactions with immune sera from guinea pigs previously infected with Eastern equine encephalomyelitis but did not give reactions with sera from normal guinea pigs or immune sera from guinea pigs which had been infected with Western equine encephalomyelitis.

The table also shows that antigens prepared from normal chick embryos and from chick embryos infected with Eastern equine encephalomyelitis and Western equine encephalomyelitis reacted to known syphilitic human sera. Obviously, these antigens would give a false reaction if tested on patients harboring syphilis antibodies.

To demonstrate the fact that the phenomena of false reactions are not confined to antigens made from chick embryos, a group of antigens were prepared from infected brain tissue. 10% suspensions of mouse brains carrying the infectious organism of Eastern equine encephalomyelitis, Western equine encephalomyelitis, St. Louis encephalitis and Japanese B. encephalitis viruses were prepared in isotonic saline using a Waring blender. A suspension of normal mouse brains to serve as a control was prepared in the same way. The suspensions were permitted to remain in the refrigerator overnight whereupon they were frozen and thawed five times, followed by centrifugation for 20 minutes at 3000 R. P. M. The clear supernatant liquor constituted the antigen. Mouse infectivity tests were made and showed the antigens to have a titer between $10^{-8}$ and $10^{-9}$. The same complement-fixation procedure were used as in the tests previously described. The results are shown in the following table:

TABLE II

Complement fixation tests with unextracted mouse brain antigens

| Serum | Syphilitic Human Serum | | | | | |
|---|---|---|---|---|---|---|
| Antigen | Eastern E.E. | Western E.E. | St. Louis E. | Japanese B. | Normal Mouse | Kolmer |
| Serum Dilution: | | | | | | |
| 1:4 | 4 | 4 | 4 | 4 | 4 | 4 |
| 1:8 | 4 | 4 | 3 | 4 | 4 | 4 |
| 1:16 | 2 | 4 | 1 | 3 | 3 | 4 |
| 1:32 | — | 3 | — | — | ± | 4 |
| 1:64 | — | — | — | — | — | 3 |

Tests not recorded showed the antigens to be specific for homologous immune sera and not reactive with normal or heterologus sera. As indicated above, however, the antigens gave false positive reactions when tested against known syphilitic human serum. This series of tests indicates the presence of the syphilitic antigen in complement-fixation diagnostic antigens prepared from mammalian animal tissue as well as avian tissues. As in the case of the antigens prepared from chick embryos, the preparation would frequently lead to false reactions when used as a diagnostic antigen in testing sera of human beings.

As previously indicated, attempts to separate the syphilitic antigen from the viral antigen have not been successful in that the syphilitic antigen was not removed completely or the viral antigen was likewise removed, denatured, or otherwise changed in titer until the preparation no longer was a suitable agent for diagnostic purposes. In investigating ways of overcoming the previous difficulties, a number of antigens were prepared, dried without destroying the antigenicity, and extracted with various solvents while in the dry state. These antigens were later reconstituted in isotonic saline and tested.

The test antigens were prepared from infected chick embryos and mouse brains. The chick embryos were homogenized with sterile distilled water to a 50% suspension. 50% suspensions of mouse brains were found too viscous and, therefore, 25% suspensions were prepared.

After standing in the refrigerator overnight the suspensions were shell frozen in thick-walled bottles in a mixture of Dry Ice and alcohol and permitted to remain frozen overnight. Following this they were subjected to a vacuum and dried from the frozen state.

The dried and pulverized tissues were extracted twice with various solvents using a volume equivalent to 1.5 times the volume of the original tissue suspension. The earlier extractions were carried out overnight, but subsequent work indicated that satisfactory extractions may be made in a much shorter time.

The solvent was separated by filtration using a Buchner funnel containing a single layer of coarse filter paper. The tissue was then dried, pulverized and re-extracted. Most of the extractions were conducted at about 4° C.

The extracted and pulverized tissue was then treated under vacuum to remove any residual solvent and the dry powder was resuspended in isotonic saline to the original volume and permitted to stand in the chill room for two or three days. The supernatant fluid resulting from centrifugation at 3000 R. P. M. for one-half hour constituted the antigen. These supernatant fluids were found to contain active virus of high infectivity titer. They were inactivated by an addition of formaline to 0.05% concentration followed by exposure to room temperature for five days.

The various solvent-extracted antigens were tested for specificity against known syphilitic human serum. It was found as a result of these tests that the antigens which had been extracted with ethanol, carbon tetrachloride, ethyl ether, and ethyl acetate gave positive reactions with the syphilitic serum at serum dilutions of 1-4 and even higher indicating that the antigen responsible for the false reaction was not entirely removed by these solvents. It was found, however, that dichloroethylene was a satisfactory solvent in that it removed the syphilitic antigens without appreciable effect upon the viral antigens.

Various other antigens from tissue infected with other viral and Rickettsial diseases, such as Rocky Mountain spotted fever and typhus fever were also prepared. It was found that dichloroethylene was able to extract the syphilitic antigen from tissue, either of animal or egg source, without substantially lowering the titer of the viral or Rickettsial antigen.

The source of antigenic material used for preparing the improved diagnostic antigens of the present invention is not particularly critical. As shown, improved antigens have been prepared from animal tissue from both mammalian and avian sources. Viruses and Rickettsiae have the common property of requiring living tissue for propagation and antigen production and, therefore, the viral and Rickettsial antigens will be obtained from living tissue. As the syphilitic antigen appears to be associated with lipoids, the tissue will usually be fat-bearing tissue. Ordinarily, tissue which tends to be rich in the antigen is selected for use. Such tissues include animal brains, spleen, heart, liver and other organs of the animal body and also the blood or the whole animal itself. From egg sources the richest supply of antigen will be found in any of the chorio-allantoic membrane, the yolk sac membrane, or the embryo, depending upon the particular viral or Rickettsial infection. In some cases the chorio-allentoic fluid may be most suitable. The term "tissue" is used herein to include all of these sources.

Infection of the living tissue with the infected viral or Rickettsial tissue suspensions is an old process well understood in the art and is not intended to be claimed herein as a part of the present invention. Detailed description of this procedure is available in the literature. Likewise, the preparation of antigens from such tissues by extraction with aqueous fluids and separation of tissue is common procedure.

In preparing the antigens the infected tissue is usually suspended in water with the aid of mechanical disintegration. Repeated freezing and thawing of the preparation may help to liberate the antigen from the tissue. Tissue suspensions are usually made with isotonic saline solutions but this is not necessary, as sterile water or other solutions may be used. The bulk of the tissue may be separated from the antigens either before or after extraction with dichlorethylene. Some of the extraneous tissue and lipoidal matter may be removed by centrifugation. A pre-extraction with a fat solvent, such as ether, may precede the extraction with the dichlorethylene if desired.

The preferred method of separating the syphilitic antigen from the viral or Rickettsial antigens involves the extraction of dried tissue with dichlorethylene. In this process the tissue, which may be inactivated with formalin or other inactivating agent, is dried by any method which can be used to dry the product without adversely affecting the antigens. One such method is to quickly freeze the aqueous suspension at temperatures as low as —70° C. and then subject the preparation to the action of a very high vacuum while maintaining the material in a frozen state. The resulting dry preparation can be very easily extracted in a Soxhlet extractor or the like. The extracted material is then treated with water or saline, and allowed to hydrate until the antigen is in solution. The tissue may then be separated by centrifugation, decantation, filtration, or otherwise, as desired.

A satisfactory but less desirable method involves extraction of the aqueous tissue suspension with the dichlorethylene whereby the syphilitic antigen is removed. The solvent is then removed from the aqueous suspension by subjecting it to the action of a vacuum and the tissue and other extraneous matter removed by centrifugation. The clear supernatant liquor contains the viral or Rickettsial antigens freed from the syphilitic antigens.

The procedures just described are applicable to the preparation of a large variety of diagnostic antigens and vaccines prepared from living tissue. Of these may be mentioned the antigens of viruses causing diseases such as Kenya fever, St. Louis encephalitis, Western equine encephalomyelitis, Eastern equine encephalomyelitis, Venezuelan equine encephalomyelitis, Russian spring-summer encephalitis, Japanese B. encephalitis, louping ill, rabies, hog cholera, and dog distemper; the antigens of Rickettsiae causative of tsutsugamushi disease (scrub typhus), epidemic typhus, endemic typhus, Rocky Mountain spotted fever, American and Australian Q fevers, boutonneuse fever and South African tick bite fever; and other related organisms responsible for poliomyelitis, psittacosis, ornithosis, pneumonitis, and lymphogranuloma venereum; and still others.

Because of the virulence of most of the antigenic preparations it will be understood that they should be inactivated before use as a diagnostic antigen. Many methods of inactivation are known but the preferred method appears to involve the use of formalin. Other methods of inactivation, such as the use of phenol, ultra-violet radiation, and other physical and chemical means, are known to those skilled in the art and need not be described in detail herein.

This is a continuation in part of my co-pending application Serial Number 697,580, filed September 17, 1946, now abandoned.

I claim:

1. A method of preparing complement-fixing diagnostic antigens which comprises the steps of drying fat-bearing tissue containing naturally occurring syphilitic antigens and antigens resulting from the growth therein of an infectious agent of the group consisting of viruses and Rickettsiae without substantial destruction of the antigens contained therein by subjecting the antigen bearing tissue to freezing temperature and vacuum, extracting the preparation with dichloroethylene to remove the syphilitic antigens associated therewith, suspending the extracted tissue in water and separating the water insoluble matter from the resulting solution which contains water-soluble dichloroethylene-insoluble complement-fixing antigens.

2. A method of preparing complement-fixing diagnostic antigens which comprises the steps of preparing an aqueous suspension of fat-bearing tissue containing naturally occurring syphilitic antigens produced by a virulent agent of the group consisting of viruses and Rickettsiae which have been propagated in said tissue, drying the suspension without substantial destruction of the antigens therein by freezing and subjecting it to vacuum, extracting the dry preparation with dichlorethylene to remove the syphilitic antigens, suspending the extracted tissue in water, and centrifuging the suspension to obtain a clear, tissue-free aqueous solution of antigen free from a tendency to give positive reactions in the complement-fixation test with syphilitic sera.

3. A method of preparing complement-fixing diagnostic antigens which comprises the steps of preparing an aqueous suspension of fat-bearing tissue containing naturally occurring syphilitic antigens and antigens produced by organisms of the group consisting of virus and Rickettsiae, contacting the fat-bearing tissue with dichlorethylene to remove syphilitic agents associated therewith, separating the dichlorethylene solution from the extracted tissue, by subjecting the tissue to reduced pressure, suspending the extracted tissue in water and separating the water insoluble matter from the solution containing the water-soluble dichlorethylene-insoluble complement fixing antigens.

CARL J. DE BOER.

(References on following page)

REFERENCES CITED

The following references are of record in the file of this patent:

UNITED STATES PATENTS

| Number | Name | Date |
|---|---|---|
| 2,439,229 | Vanderscheer | Apr. 6, 1948 |

FOREIGN PATENTS

| Number | Country | Date |
|---|---|---|
| 95,581 | Sweden | May 2, 1939 |
| 506,095 | Great Britain | May 23, 1939 |

OTHER REFERENCES

Wertman in J. Lab. & Clin. Med., 1945, 30: pages 112–115.

Topping in U. S. Public Health Reports, vol. 61, May 17, 1946, pages 701–706.

Topping in U. S. Public Health Reports, vol. 61, May 31, 1946, pages 778–781.

Cox in U. S. Public Health Reports, vol. 53, December 23, 1938, pages 2241–2242.